P. G. ZIMMERMANN.
FUSELAGE WIRING.
APPLICATION FILED JULY 6, 1918.

1,358,605.

Patented Nov. 9, 1920.

Inventor
PAUL G. ZIMMERMANN.
By Attorney

UNITED STATES PATENT OFFICE.

PAUL G. ZIMMERMANN, OF NILES, OHIO, ASSIGNOR TO CURTISS AEROPLANE AND MOTOR CORPORATION, A CORPORATION OF NEW YORK.

FUSELAGE-WIRING.

1,358,605.   Specification of Letters Patent.   Patented Nov. 9, 1920.

Application filed July 6, 1918. Serial No. 243,715.

*To all whom it may concern:*

Be it known that I, PAUL G. ZIMMERMANN, a citizen of the United States, residing at Niles, in the State of Ohio, have invented certain new and useful Improvements in Fuselage-Wiring, of which the following is a specification.

My invention relates to airplane fuselage wiring and is characterized as follows: Instead of continuing uninterruptedly from opposite ends of adjacent fuselage struts or posts the fuselage wiring is interrupted or discontinued. Accordingly four separate wire strands or lengths are required; and not two as heretofore. The four wire lengths however are united by an appropriate band or ring of suitable size. This band or ring although supported by separated wire lengths enters into and actually constitutes part and parcel of the fuselage truss.

The conventional practice in trussing an airplane fuselage is to connect the opposite ends of adjacent fuselage struts by cross arranged wires of an over-all length sufficient to extend uninterruptedly diagonally across the fuselage. This practice, while exceedingly efficient mechanically is oft times objectionable for the reason that the cross arranged wires constitute a barrier and accordingly prevent projection or extension of any element whatsoever from a point within the confines of the fuselage to a point without or beyond the plane of its sides. For structural reasons it is highly impractical to attempt to dispense with the wiring. For betterment of design, and in the interest of longitudinal balance it becomes necessary at times to utilize that space ordinarily occupied by the fuselage wiring for other useful load. Hence it is the object of this invention to so arrange the fuselage wiring that the space above referred to may be occupied by such useful load as the design of the machine may deem best without materially altering the character of the fuselage truss or weakening it to any appreciable extent. Moreover, by the incorporation of a band or ring in the fuselage truss at the point or points above referred to the ring itself may act as a retaining means for the element extended through it or as a centering means or boundary line where the space which it defines is used for other purposes.

Figure 1:
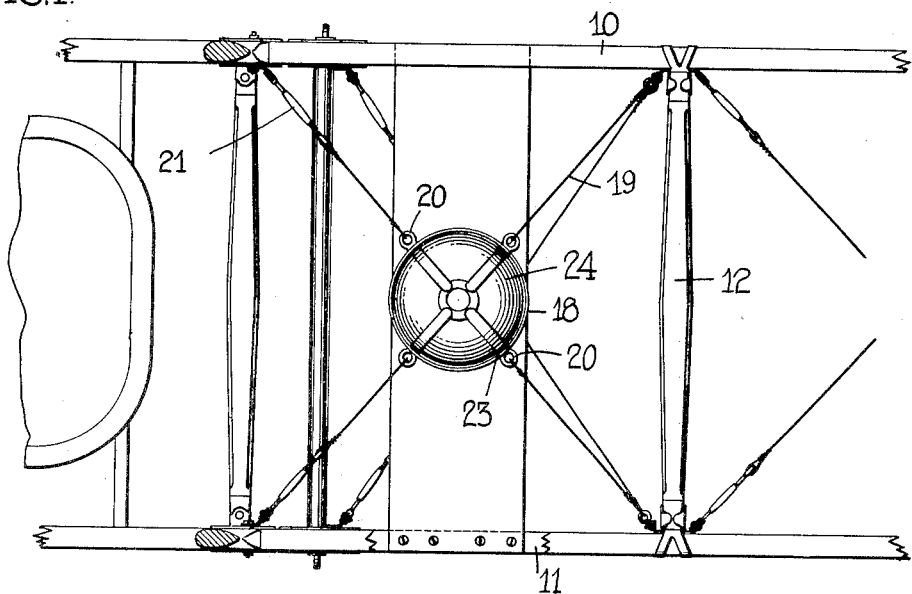
Figure 2:
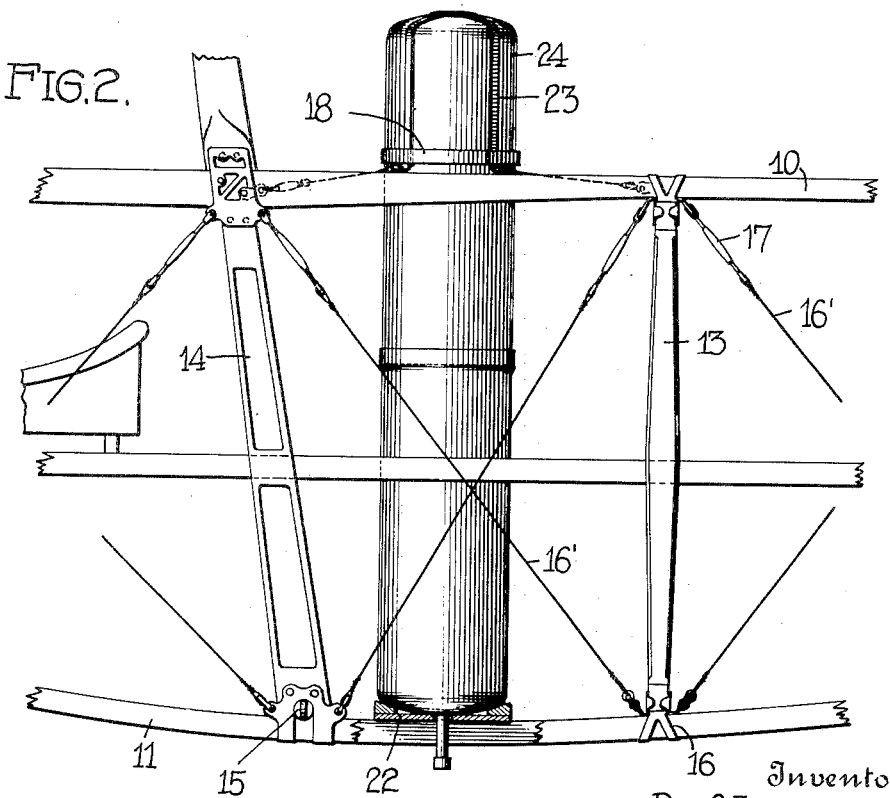

Of the drawings:

Figure 1 is a plan view of a portion of an airplane fuselage showing the improved form of fuselage truss, and Fig. 2 is a side elevation of that portion of the fuselage illustrated in Fig. 1 showing the manner in which a tank is held in place within the fuselage although a considerable portion of its area is extended beyond the plane of one of the fuselage sides.

It is to be understood at the outset that I do not intend to limit the invention to the particular character of equipment or useful load encompassed or encircled by the band above referred to. It may or may not snugly engage that element or the item of useful load extended through it and the item of useful load may be the pilot or passenger in order that either or both may be accorded additional space to move about it. It is the broad idea of interrupting the fuselage truss in a manner such that the space ordinarily occupied by the fuselage wiring may be put to other use which constitutes the genesis of the invention herein claimed.

In the drawings the fuselage is shown as comprising upper longerons 10, lower longerons 11, horizontal fuselage struts 12, vertical fuselage struts 13, vertical fuselage posts 14, a wing tie-tube 15 and appropriate fittings 16, the latter being provided respectively at the points of intersection of the struts 12 and 13 and the fuselage posts 14 with the longerons 10 and 11. The nature of the fittings, the character of the longerons and the form of the struts and posts may be varied as desired.

The fuselage wiring except at such sections as are designed to accommodate elements extending beyond the planes of the sides of the fuselage is of more or less conventional form. It comprises cross arranged wires 16' which connect opposite ends of adjacent struts, the wires being tightened or drawn taut by turnbuckles 17 of ordinary construction. The wires 16' are preferably anchored at the fittings 16 which are in turn carried by the longerons 10 and 11.

At one side of the fuselage (the top side in the embodiment disclosed) and at one or more stations or sections throughout its length the wiring is differently arranged. Instead of extending uninterruptedly diagonally across the fuselage as above pointed out it is interrupted and a ring or band incorporated in the truss. This band, designated as 18, may be of any shape or character desired, the only requisite being that it possess sufficient strength to withstand without distortion the stresses set up in it by the tightening of the wire lengths with which it is directly associated. These wire lengths 19 are four in number and of a length insufficient to extend diagonally across the fuselage. They are arranged in pairs with the wire lengths constituting each pair substantially alined. The wire lengths 19 are terminally anchored to the fittings 16 at one end and to eyes 20 formed upon the band 18 at their opposite end. They extend (see Fig. 1) radially from the band and incorporate the band as an actual element of the fuselage truss. By incorporating the band as an element of the truss it is to be understood that although space is provided in the plane of the fuselage top of a size equal to the size of the band, the truss itself is in nowise weakened for the reason that the wire lengths 19 may be drawn taut in the usual manner by turnbuckles 21 and the fuselage cross braced as rigidly as if the band 18 were omitted altogether.

Where the band 18 is made of a size just large enough to encircle the element extended without the confines of the fuselage its utility is increased. It then not only constitutes an element of the fuselage truss but it also constitutes a retaining means for the element of useful load which it embraces. In the illustrated embodiment of the invention this form of band is disclosed. The element of useful load carried within the fuselage and extended beyond its confines is nothing more nor less than a tank. It is supported upon a floor board 22 extended across the bottom of the fuselage and held in an upright position by the band 18 by reason of its projection therethrough and beyond the plane of the fuselage top. It is held against vertical displacement by straps 23 which are fastened to the band and pass radially and upwardly over the top of the tank, designated as 24. Furthermore, the particular fuselage station at which the band 18 is provided is immaterial. If the element of useful load were of necessity extended transversely of the fuselage to project beyond its sides then the band 18 would be incorporated in one of the sections or stations of the fuselage defined by adjacent vertical struts 13 or posts 14. It is the idea of so arranging the wiring that an element or item of useful load might extend beyond it without weakening it which I consider the broadest aspect of the invention as hereinafter claimed.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. An airplane fuselage truss including struts, longerons and wiring, the wiring comprising individual wire lengths which extend diagonally inwardly from the points of intersection of the struts with the longerons, the diagonally opposed wire lengths being substantially alined and connected although of insufficient length to extend uninterruptedly diagonally across the fuselage, said connection being of such size and proportions as to define an open space through which an item of useful load may extend.

2. An airplane fuselage truss including in combination, struts, longerons and wiring, the wiring comprising individual wire lengths which jointly support a connecting element, the connecting element in turn defining an open space of such size and proportions that an item of useful load may be extended into and through it and without the confines of the fuselage.

3. The combination with the longerons and struts of an airplane fuselage, or wiring fastened to the fuselage at or near the points of intersection of the struts with the longerons, the wires between adjacent struts extending angularly inwardly, and a band carried by the several wires in a manner such that a tightening of the wires tends to more firmly hold the band in place, the band itself constituting a part of the fuselage truss and defining an open space into and through which an item of useful load may be extended.

4. An airplane fuselage truss including in combination with the fuselage struts and longerons, a band, wire lengths fastened to the fuselage at or near the points of intersection of the struts with the longerons and of a length insufficient to extend diagonally across the fuselage although their length added to the area of the band as measured by its diameter is sufficient to complete the truss at the particular station of the fuselage embracing the band, the band itself being of such size and proportions as to define an open space in the plane of one side of the fuselage into and through which an item of useful load may be extended.

5. An airplane fuselage truss including in combination, struts, longerons and wiring, said wiring comprising a plural number of individual wire lengths and a connecting element, the connecting element being fastened to the individual wire lengths and so related to the wires as to define an open space in the plane of one of the sides of the fuselage through which an element carried by and within the fuselage may be extended without its confines and may occupy that space ordinarily occupied by the cross arranged wires of the truss at their point of intersection.

6. An airplane fuselage truss including struts, longerons, wiring comprising individual wire lengths extending diagonally inwardly from the points of intersection of the struts with the longerons, the diagonally opposed wire lengths being connected and of insufficient length to extend diagonally across the fuselage, and a band carried by the individual wire lengths and entering into the fuselage truss, said band constituting the wire connection and defining a space in the plane of one side of the fuselage through which an element may extend to and beyond the plane of the side of the fuselage without weakening the truss.

In testimony whereof I hereunto affix my signature.

PAUL G. ZIMMERMANN.